United States Patent [19]
Ostergaard et al.

[11] Patent Number: 6,161,650
[45] Date of Patent: Dec. 19, 2000

[54] LUBRICATING SYSTEM FOR A VIBRATORY APPARATUS

[75] Inventors: David A. Ostergaard; Karen L. Knox, both of Cedar Rapids; Edwin J. Sauser, Monticello, all of Iowa

[73] Assignee: Cedarapids Inc., Cedar Rapids, Iowa

[21] Appl. No.: 09/274,161

[22] Filed: Mar. 22, 1999

[51] Int. Cl.[7] .................................................... F01M 9/06
[52] U.S. Cl. ...................... 184/13.1; 184/11.1; 184/106
[58] Field of Search ................................ 184/6.12, 13.1, 184/11.1, 6.22, 106

[56] References Cited

U.S. PATENT DOCUMENTS

| | | | |
|---|---|---|---|
| 3,625,310 | 12/1971 | Herrick | 184/6.12 |
| 4,270,497 | 6/1981 | Valerio | 123/195 C |
| 4,414,861 | 11/1983 | Witt | 74/606 A |
| 4,632,751 | 12/1986 | Johnson et al. | 209/326 |

*Primary Examiner*—David Fenstermacher
*Attorney, Agent, or Firm*—Marshall, O'Toole, Gerstein, Murray & Borun

[57] ABSTRACT

A wheel case for a vibratory device. A vibratory device for vibrating aggregate material includes a frame and a rotating shaft extending transversely across the frame, with the shaft being rotatably supported on bearings and having a wheel moveable through a circular path. The bearings and the wheel are disposed in a wheel case which includes a housing having a base, a peripheral sidewall, and a cover, with the housing being sized to receive therein the wheel and the bearings and further being adapted to contain therein a quantity of lubricating oil for lubricating the wheel and the bearings. A baffle is mounted to either the housing base or the housing cover, and extends inwardly into the housing and includes a portion disposed adjacent the wheel path. The baffle is adapted to distribute lubricating oil to the bearings in response to rotation of the wheel.

26 Claims, 7 Drawing Sheets

LUBRICATING SYSTEM FOR A VIBRATORY APPARATUS

FIELD OF THE INVENTION

The present invention relates to vibratory devices such as vibrating screens for classifying aggregate and vibratory feeders for feeding aggregate to crushing and processing devices. More specifically, the present invention relates to a lubrication system for lubricating and cooling the rotating components disposed inside of a wheel case of the vibratory device.

BACKGROUND OF THE INVENTION

Vibrating screen devices and vibrating feeder devices are generally well known in the art. On a typical vibrating screening device, a system of classifying screens are mounted to a frame which in turn is supported on a system of springs. At or near the center of the device is an eccentrically weighted shaft unit, typically having one, two, or three or more rotating and eccentrically weighted shafts. On a multi-shaft unit, the shafts may be counter-rotating such that the eccentric weights are oriented in the same direction twice each revolution. This causes the screen to vibrate, which aids the classifying effects of the screen device. On a vibrating feeder, a similar shaft unit vibrates the feed trough or chute, which "throws" the aggregate contained in the trough in a desired direction. An example of such a device can be found in U.S. Pat. No. 4,340,469 issued to Archer.

The ends of the rotating shafts are supported by bearings, and the shafts are operatively coupled to a drive motor. Each shaft includes a gear or drive wheel. The eccentric weights are typically attached directly to the drive wheel.

The bearings and the gear teeth on the drive wheels require constant lubrication, and thus such components are disposed within a housing or wheel case containing a quantity of oil or other suitable lubricating fluid. A wheel case is typically provided on each side of the vibratory device, with each wheel case typically being bolted to an adjacent sidewall or a portion of the frame of the vibratory device.

Proper lubrication of the wheel case, and proper cooling of the lubricant, is a continuing problem. Typically, the oil level inside the wheel case is near the lowest point of travel of the wheel (bottom dead center). The oil level is maintained such that the weights attached to the rotating wheel dip strike the oil and "splash" the oil upward, thereby splashing oil onto the bearings. The gear teeth on the outer circumference of the wheel, which has a swing diameter slightly greater than the swing diameter of the rotating weights, dip slightly deeper into the oil level, thus lubricating the outer portions (i.e., the gear teeth) of the wheel.

In practice, it has been discovered that the temperature of the oil is very dependent on the how far the rotating weights dip into the oil. If the oil level is increased so that the weights dip further into the oil, the operating temperature of the oil rises, as does the operating temperature of the various components, especially the bearings. Accordingly, to keep the oil temperature down conventional practice has been to maintain the oil at a sufficiently low level so that only the gear teeth, but not the weights, actually dip into the oil. In practice, the oil is agitated by the gear teeth on the rotating wheels, and the oil is further agitated by the resulting vibration of the vibratory device. The rotating weights contact the agitated oil and distribute the oil to the bearings.

Unfortunately, in practice there is a significant lag time between the initial start-up of the vibratory device and the time the oil is warm enough and agitated enough to be properly distributed by the rotating weights. This lag time is exaggerated by low ambient temperatures when the oil is significantly more viscous. During this lag time the bearings are starved of lubricant, which leads to premature bearing failure.

Another problem in conventional wheel cases is that the action of the rotating wheels and the attached weights tend to shift the oil within the housing, creating areas of oil accumulation and areas of oil depletion. The areas of oil depletion decrease the amount of oil available for distribution to the bearings, leading to bearing failure. This problem is accentuated in two-shaft and three-shaft units.

Accordingly, the present invention is directed to an improved wheel case having an improved lubrication system. This improved lubrication system for a wheel case fosters better distribution and cooling of the lubricant and serves to extend the useful life span of the rotating components housed within the wheel case.

SUMMARY OF THE INVENTION

According to one aspect of the invention, on a vibratory device for vibrating aggregate material having a frame and a rotating shaft extending transversely across the frame, with the shaft being rotatably supported on bearings and having a wheel moveable through a circular path, a wheel case comprises a housing having a base, a peripheral sidewall, and a cover, with the housing being sized to receive therein the wheel and the bearings and further being adapted to contain therein a quantity of lubricating oil for lubricating the wheel and the bearings. A baffle is mounted to either the housing base or the housing cover, and extends inwardly into the housing and includes a portion disposed adjacent the wheel path. The baffle is adapted to distribute lubricating oil to the bearings in response to rotation of the wheel.

In further accordance with a preferred embodiment, a baffle is mounted to the cover, which is removable from the housing. Preferably, the baffle includes a curved portion or an arc shaped portion, with the curved or arc shaped portion being concentric with the wheel path. The wheel includes opposing sides which may have an eccentric weight mounted to one of the sides and being moveable through a circular path. The baffle may be spaced radially outwardly from the weight path. The curved or arcuate portion of the baffle is preferably generally concentric with the weight path.

A hub may be operatively connected to the shaft and the wheel, and the hub is adapted to cooperate with the baffle for distributing oil to the bearings in response to rotation of the wheel. The hub includes an outer portion having a plurality of circumferentially spaced holes, which holes are aligned with the bearings. The hub further includes a circumferential outer edge and a peripheral sidewall spaced radially inward from the outer edge. A radially inwardly facing portion of the sidewall defines an oil receiving pocket aligned with, and being adapted to distribute oil to, the bearings.

According to another aspect of the invention, on a vibratory device for vibrating aggregate material, the vibratory device having a frame and a rotating shaft extending transversely across the frame, the shaft being rotatably supported on bearings and having a wheel moveable through a circular path, a wheel case comprises a housing having a base, a peripheral sidewall, and a cover, with the housing being sized to receive therein the wheel and the bearings and further being adapted to contain therein a quantity of lubricating oil for lubricating the wheel and the bearings. Means are provided for distributing oil to the bearings and the wheel in response to rotation of the shaft, with the means being defined by cooperating portions of the wheel and the housing.

According to a further aspect of the invention, on a vibratory device for vibrating aggregate material, the vibratory device having a frame and a rotating shaft extending transversely across the frame, the shaft being rotatably supported on bearings and having a wheel moveable through a circular path, a wheel case comprises a housing having a base, a peripheral sidewall, and a cover, with the housing being sized to receive therein the wheel and the bearings and further being adapted to contain therein a quantity of lubricating oil for lubricating the wheel and the bearings. A baffle is mounted to one of the housing base or the housing cover, with the baffle extending inwardly into the housing and having a portion disposed adjacent the wheel path. A hub is operatively connected to the wheel and includes a plurality of apertures, with the apertures being adapted to provide a lubricant path to the bearings. Accordingly, in response to rotation of the wheel, the baffle and the hub cooperate to provide lubricant to the bearings.

The aforementioned features and advantages, in addition to other features and advantages, win become readily apparent to those skilled in the art upon a reading of the following detailed description.

DETAILED DESCRIPTION OF THE PREFERRED EMBODIMENT

The embodiment described herein is not intended to be exhaustive or to limit the scope of the invention to the precise form disclosed. The following embodiment has been chosen and described in order to best explain the principles of the invention and to enable others skilled in the art to follow its teachings.

Figure 1:
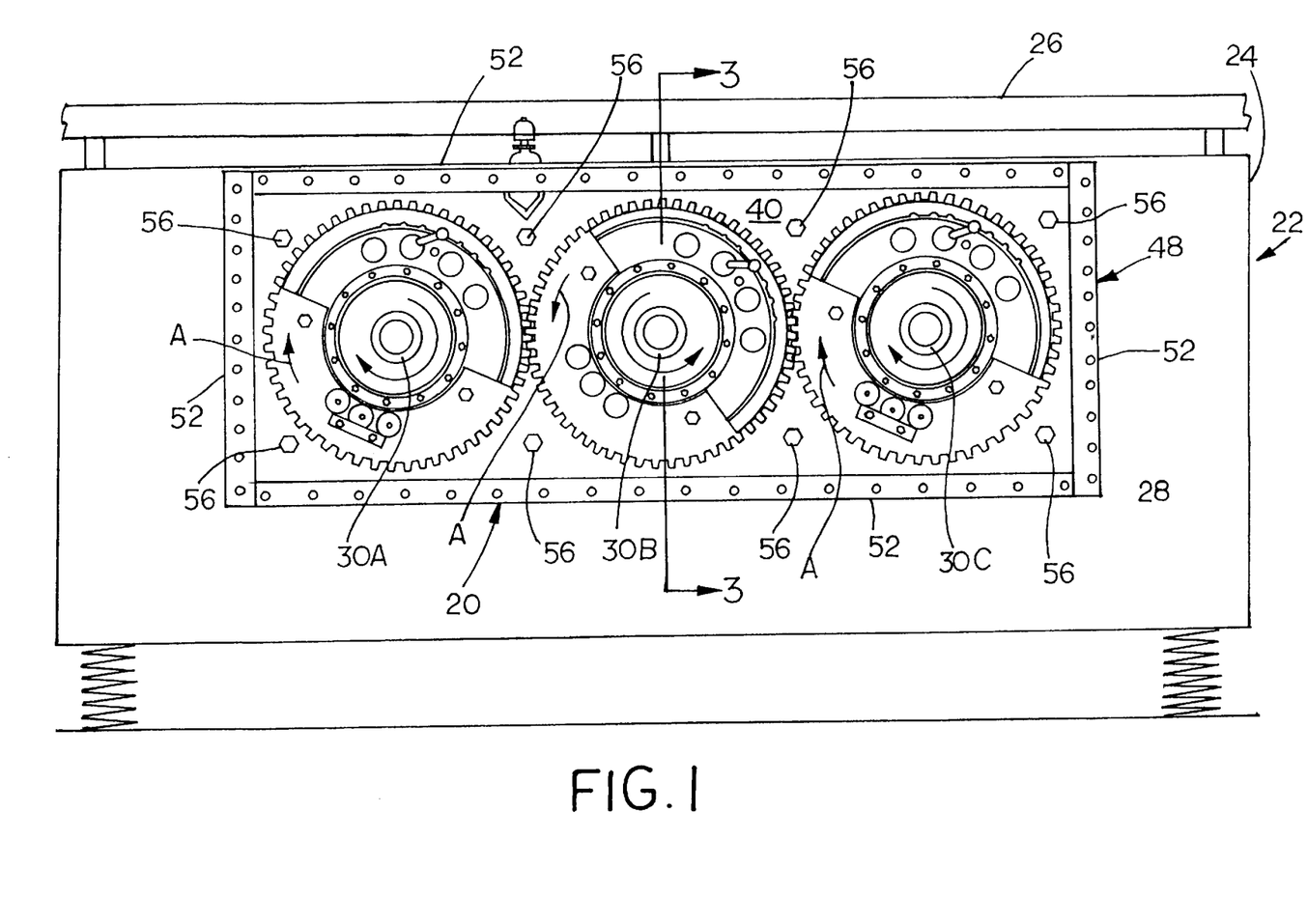
FIG. 1 is a fragmentary schematic elevational view of a vibratory device having a three shaft sealed wheel case attached to the vibratory device, the wheel case being shown with a portion cut away to reveal the wheels disposed therein.

Referring now to the drawings, a wheel case constructed in accordance with the teachings of the present invention generally indicated by the reference numeral 20 is shown in FIG. 1 in a preferred environment of use, namely, mounted on a vibrating screen device 22 of the type commonly employed in the art to process aggregate materials by classifying and/or separating the aggregate material according to size. Persons of ordinary skill in the art will recognize that the improved wheel case 20 may also be used on other devices, such as vibrating trough feeders, as well as other devices benefitting from the features to be discussed below.

As shown in FIG. 1, the vibrating screen device 22 typically includes a frame 24 supporting a deck 26 to which is mounted one or more classifying screens (not shown) of the type commonly employed for such purposes. A pair of opposing sidewalls 28 are secured to the frame 24, and one or more shafts 30, each housed in a housing 32, are rotatably mounted to the frame 24 and extend between the sidewalls 28.

Figure 2:
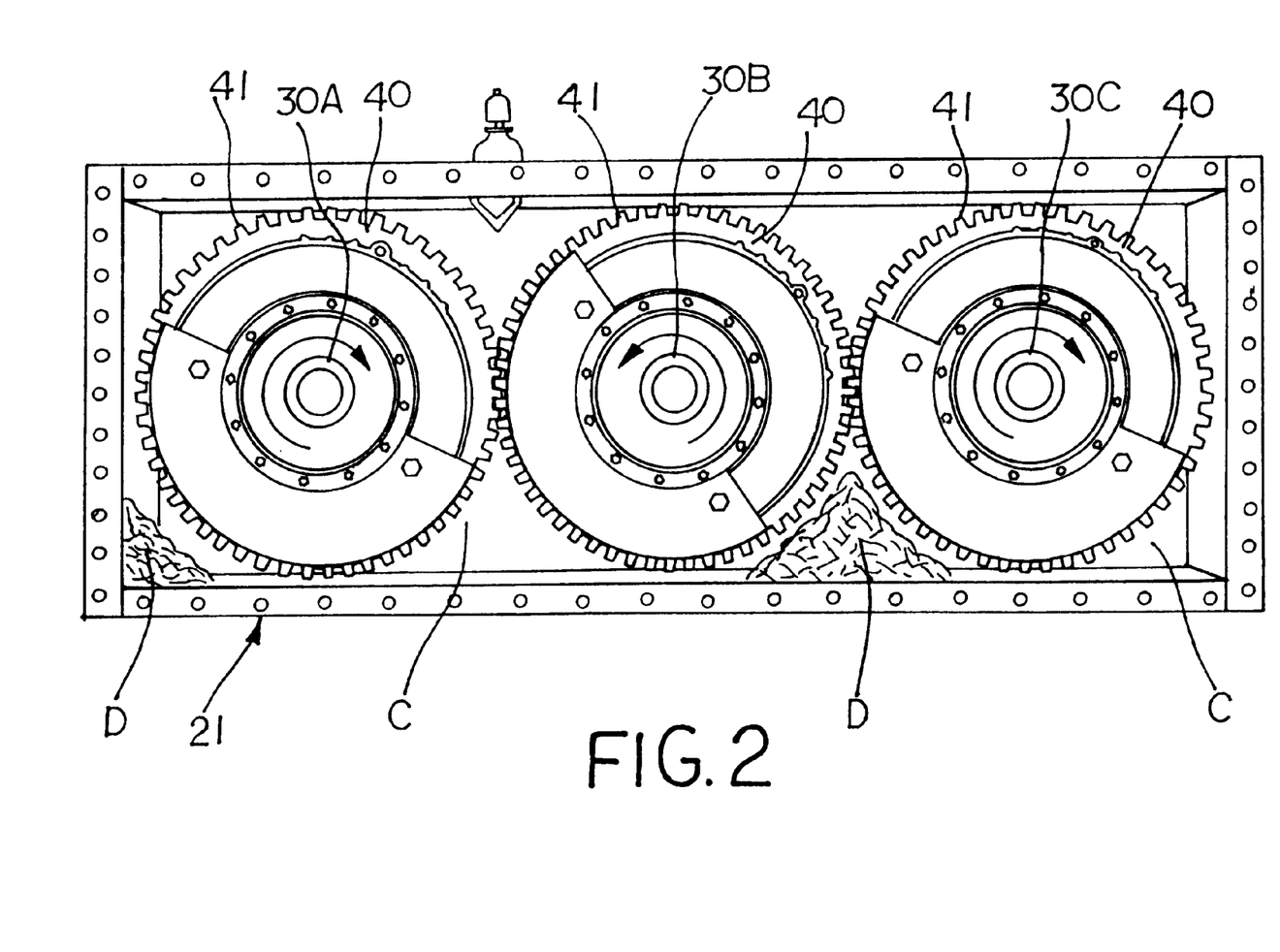
FIG. 2 is a fragmentary elevational view of a conventional wheel case showing the manner by which oil is accumulated in certain portions of the wheel case and evacuated from other portions of the wheel case during operation of the vibratory device.

As shown in FIG. 1, one or more shafts 30 are provided, for example shafts 30a, 30b, and 30c. It will be noted that, when the shafts 30a, 30b and 30c are disposed as shown in FIG. 2, the shafts 30a and 30c will rotate in a clockwise direction, while the shaft 30b will rotate in a counterclockwise direction. However, it will be understood that only a single shaft 30 will be discussed in detail. It will also be understood that at least one of the shafts 30, such as, for example, the shaft 30c shown in FIG. 3, will include a portion extending out of the cover of the wheel case 20, such as through a sealed aperture (not shown) of the wheel case 20 for operative engagement with an external drive source (not shown).

Figure 3:
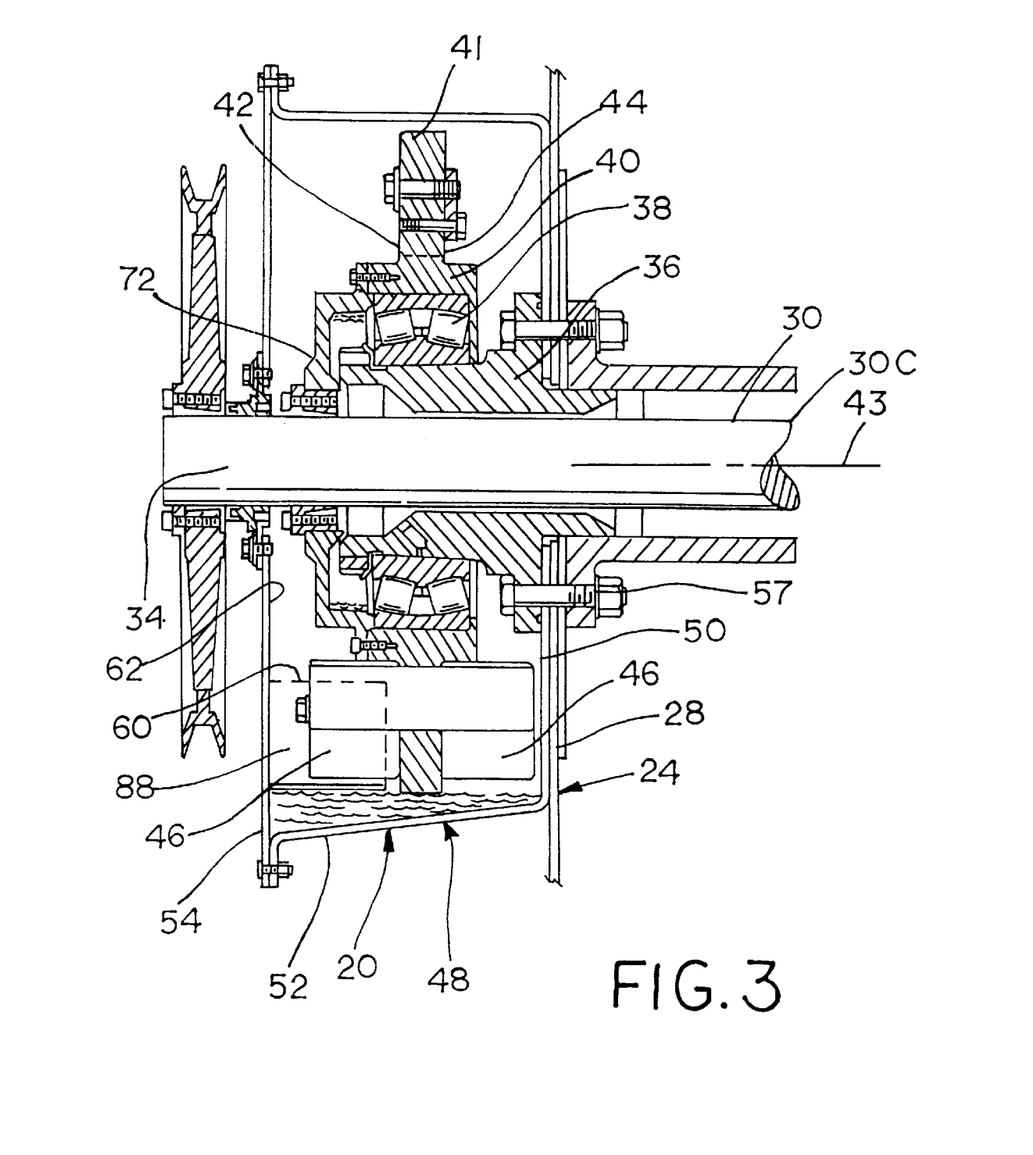
FIG. 3 is an enlarged fragmentary cross-sectional view taken along line 3—3 of FIG. 1 and illustrating a wheel case constructed in accordance with certain teachings of the present invention and showing a shaft adapted for connection to an external drive source.
Figure 4:
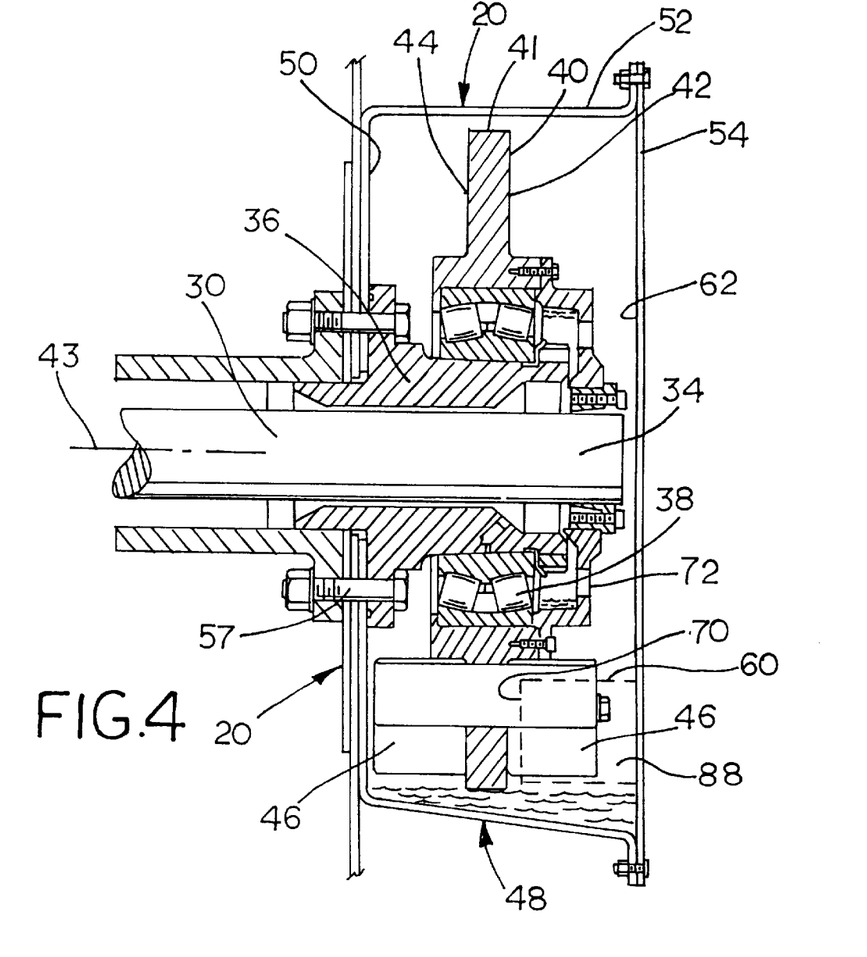
FIG. 4 is an enlarged fragmentary cross-sectional view similar to FIG. 3 but showing a shaft adapted to be driven by an adjacent rotating shaft, such as the shaft shown in FIG. 2 driven by an external drive source.
Figure 5:
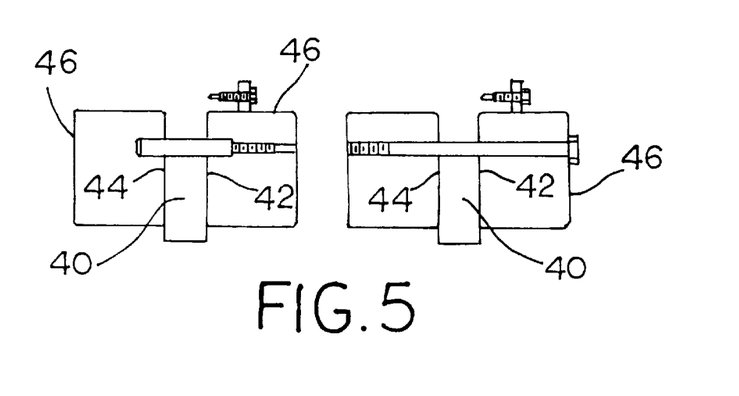
FIG. 5 is an enlarged fragmentary view illustrating the manner by which a pair of weights may be attached to opposing sides of a drive wheel.

Referring now to FIGS. 3 and 4, the shaft 30 includes an end 34 which is rotatably mounted to a spindle 36 by a bearing assembly 38. Attached to the end of the shaft 30 is a wheel 40 having a plurality of circumferential gear teeth 41. It will be understood that, as the wheel 40 rotates about a central axis 43 the gear teeth 41 will follow a circular path indicated by the reference arrow "A" shown in FIG. 1 in the proper direction for each of the shafts 30a, 30b and 30c. The wheel 40 includes an inside face 42 and an outside face 44, and one or more eccentric weights 46 are attached to the wheel 40, such as by bolting the weights to either or both of the faces 42, 44. As can be appreciated in FIG. 6, the weights 46 will follow a circular path generally indicated by the reference arrow "B", which is spaced radially inwardly from and concentric with the path "A" of the gear teeth 41. Although only one end 34 of the shaft 30 is shown, it will be understood that the other end (not shown) of the shaft 30 is substantially similar and is rotatably mounted to the opposing sidewall 28 of the frame 24 in a similar manner.

As shown in FIGS. 3 and 4, the end 34 of the shaft 30, along with the spindle 36, the bearing assembly 38, the eccentric weights 46 and the gear 32 are all disposed within the wheel case 20. It will be understood that the wheel case 20 is adapted to contain therein a quantity of lubricating oil for the purposes of supplying lubricant to the bearing assembly 38, the teeth 41 on the outer circumference of the wheel 40, and to any other components housed within the wheel case 20 as may be required. It will also be understood that the oil level within the wheel case 20 will preferably be maintained such that a portion of the wheel 40 (i.e., preferably just the outer circumferential teeth 41) will come into contact with, agitate, and will thus distribute the oil about an interior of the wheel case 20.

As shown in FIGS. 3 and 4, the wheel case 20 includes a housing 48 having a base wall 50, a peripheral sidewall 52 extending outwardly away from the base wall 50, and a cover 54 attachable to the sidewalls 52 so as to enclose the interior of the wheel case 20. The cover 54 is preferably removable as would be known to those of skill in the art in order to gain access to the various components housed within the wheel case 20. A plurality of attachment bolts 56 are provided for securing the wheel case 20 to the frame 24 (i.e., by securing the base wall 50 of the housing 48 to the sidewall 28 and the frame 24). The bolts 56 are preferably threadless bolts having pressed on collars, and preferably the bolts 56 are threadless bolts sold under the trade name Huckbolt9 and manufactured by the Federal Mogul Corporation. Other suitable fasteners, especially other suitable threadless fasteners and/or other suitable conventional bolts, cap screws or other fasteners may be employed. Conventional cap screws 57 or other suitable fasteners may be used to secure the spindle 36 in place.

Referring now to FIGS. 3, 4, 6 and 7, a plurality of baffles 60 are secured to an inner face 62 of the cover 54, so as to extend into the interior of the housing 48. Each baffle includes a pair of ends 64, 66 joined by an arc-shaped portion 68, and may be constructed of a curved steel strip that has been bolted, welded, or otherwise secured to the inner face 62 of the cover 54. The arc shaped portion 68 of the baffle 60 is preferably curved to be concentric with the rotational axis 43 of the shaft 30. Still preferably, the baffle 60 preferably extends inwardly into the housing 48 such that an inward edge 70 of the baffle 60 is disposed adjacent to the wheel 40.

Figure 8:
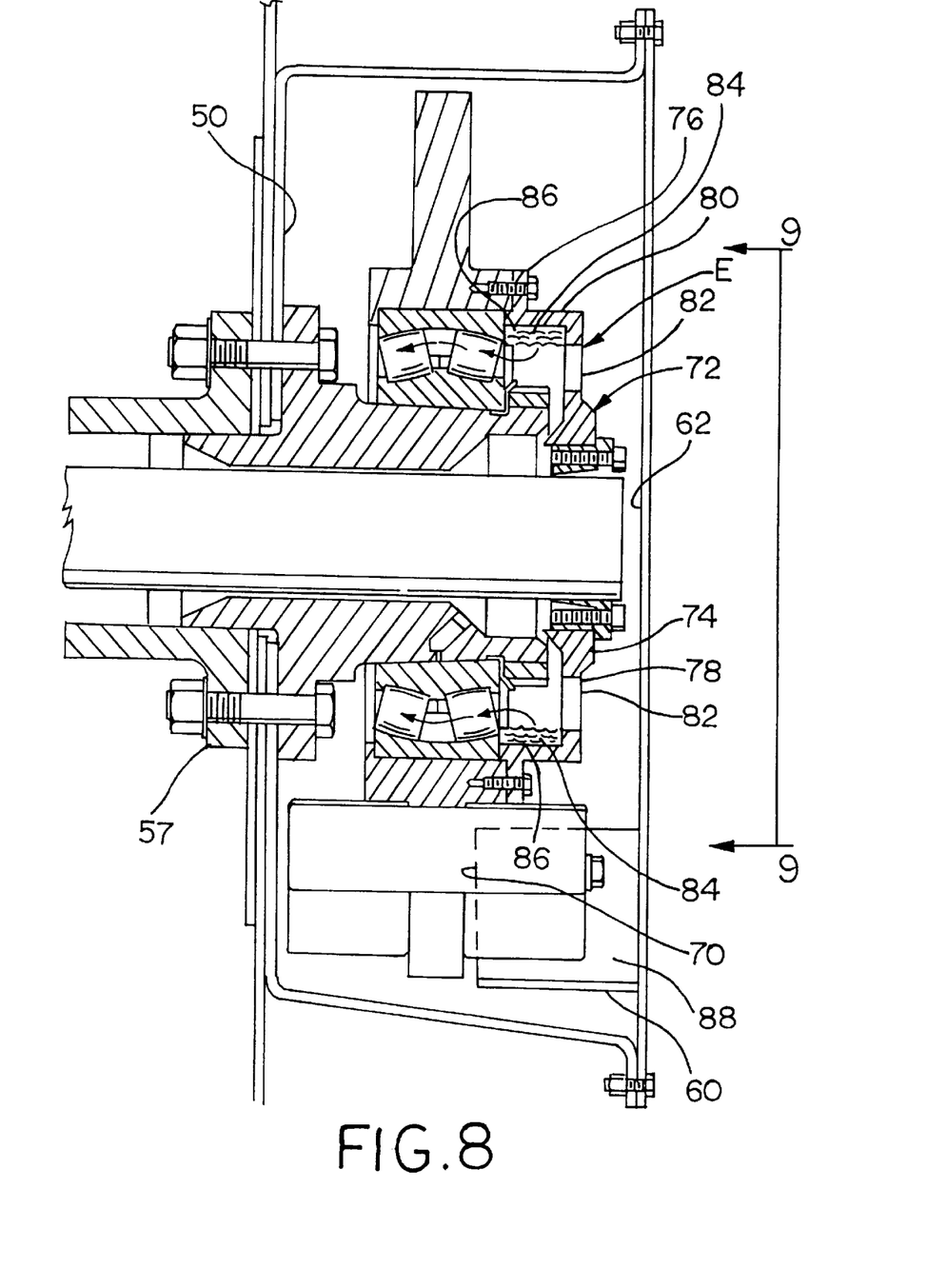
FIG. 8 is an fragmentary elevational view similar to FIG. 3 and illustrating an improved wheel hub for use with the present invention.
Figure 9:
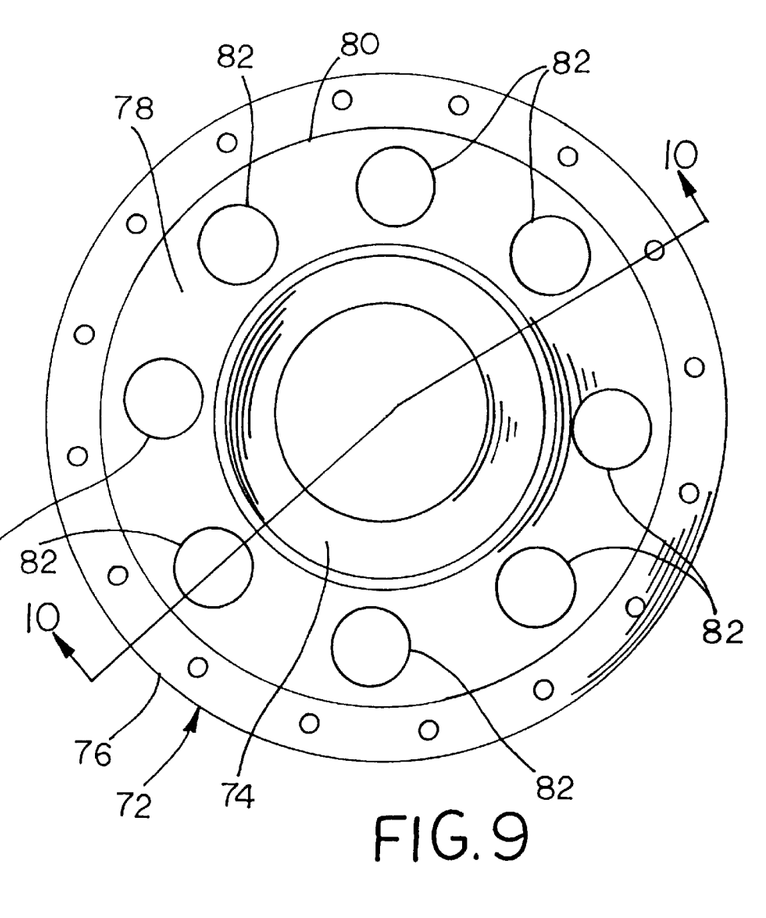
FIG. 9 is an enlarged fragmentary elevational view taken along line 9—9 of FIG. 8.
Figure 10:
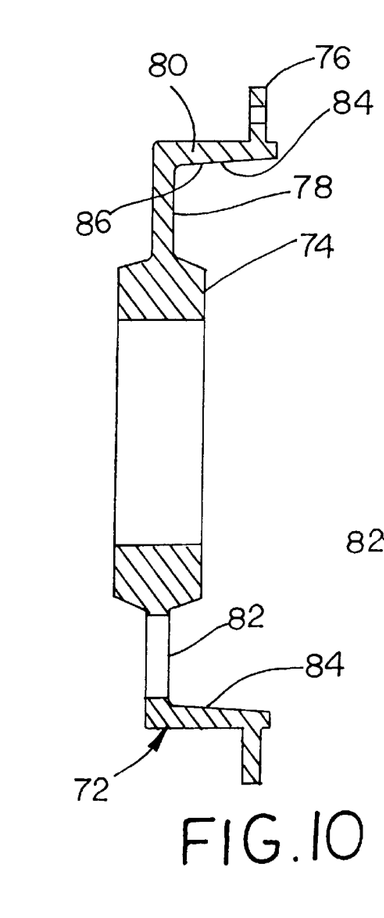
FIG. 10 is a cross-sectional view taken along line 10—10 of FIG. 9.

Referring now to FIGS. 8, 9 and 10, a hub 72 is shown. The hub 72 secures the wheel 40 to the shaft 30 such that the wheel 40 will rotate in conjunction with the shaft 30. The hub 72 includes a central portion 74, a peripheral flange 76, a central flat portion 78, and an outer sidewall 80 disposed between the central portion 74 and the peripheral flange 76. The central portion 74 is secured to the shaft 30, while the peripheral flange is connected to the wheel 40 such as by bolts. The flat portion 78 includes a plurality of apertures 82 spaced about the flat portion 78 and being spaced radially inwardly from the sidewall 80. A pocket 84 is defined in part by cooperating portions of the flat portion 78 and an inner surface 86 of the sidewall 80.

In operation, the housing 48 of the wheel case 20 is attached to the sidewall 28 of the frame 24 as shown in FIG. 3 and 4 as would be known. In response to the operation of the external drive source (not shown), the wheels 30a, 30b, and 30c will rotate in the directions shown in FIG. 1. As shown in FIG. 2, which illustrates a conventional wheel case 21 having a similar three-shaft arrangement 30a, 30b and 30c with similarly numbered wheels 40 and gear teeth 41, the shaft rotation will result in areas of oil depletion indicated by the reference arrow "C", and areas of oil accumulation, indicated by the reference arrow "D". Similar areas of oil depletion and accumulation will be defined in single-shaft, two-shaft, and other multi-shaft devices.

Figure 6:
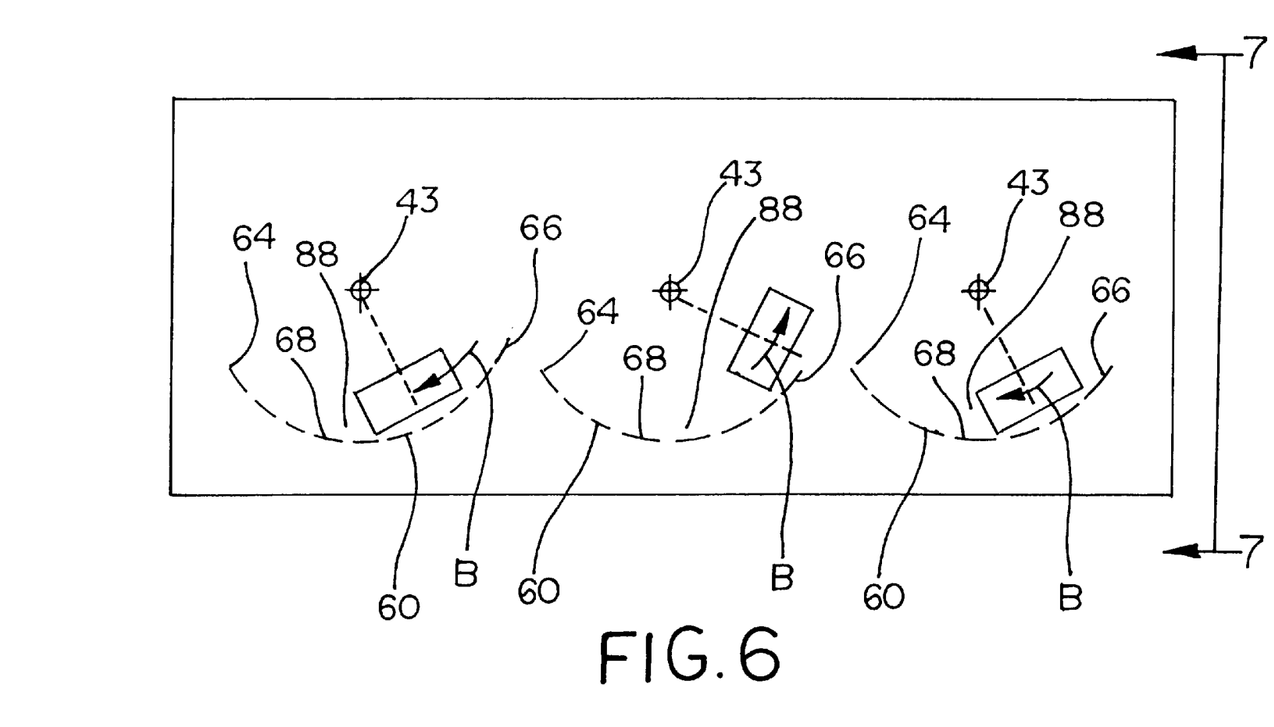
FIG. 6 is an elevational view of a wheel case cover constructed in accordance with the teachings of the present invention.
Figure 7:
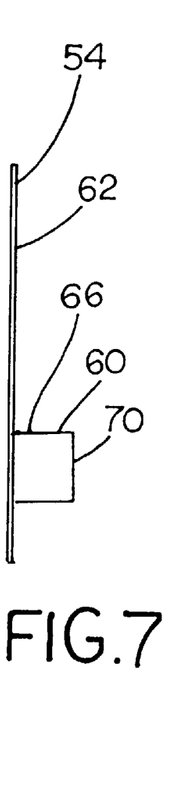
FIG. 7 is side elevational view taken along line 7—7 of FIG. 6.

As will be noted from FIGS. 3, 4 and 6, as the wheel 40 rotates, the weight 46 will travel along the weight path "B" and in so doing will pass closely adjacent to the baffle 60, so as to pick up or splash against any oil contained in a reservoir 88 defined by the baffle 60. The action of the weight 46 contacting the oil in the reservoir 88 causes the oil to be thrown toward the upper portions of the housing 48. A portion of the oil so thrown will flow toward and into the bearing assembly 38 to provide lubrication. Another portion of the oil thrown upwardly will splash against the base 50, the sidewall 52 and the cover 54, and will gradually migrate downwardly. The downward migration along these outer walls acts to cool the oil, obviating or lessening the need for external oil coolers.

The baffles 60 limit the agitating contact between the weight 46 and the oil to that area isolated by the baffle 60. Accordingly, the baffles 60 prevent the formation of the above-referenced areas of oil depletion and oil accumulation. The downwardly migrating oil ensures that the reservoir 88 is supplied with oil, thus ensuring a ready lubricant supply for distribution to the bearing assembly 38 by the weight 46.

Referring now to FIGS. 8, 9 and 10, the hub 80 rotates in conjunction with the wheel 40. As the oil contained in the reservoir 88 is thrown upwardly, the apertures 82 provide an oil flow path indicated by "E" into the bearing assembly 38. Additionally, the pocket 84 contains therein a quantity of oil, which quantity of oil takes the shape of a cylinder as the hub 80 rotates. It will be noted from FIG. 8 that the apertures 82 are located such that the pocket 84 is in alignment with, or located slightly radially outwardly of, the bearing assembly 38. Accordingly, the oil contained in the pocket 84 provides a constant supply of additional oil to the bearing assembly 38, and increases the flow of oil through the bearing assembly 38 (as opposed to conventional arrangements, in which the oil within the bearings is relatively stagnant and subject to overheating).

A portion of the oil that has been splashed upwardly lubricates the bearings as outlined above, and another portion runs down the interior walls of the housing 48, cooling the oil in the process. Some of the downwardly migrating oil thus flows into the reservoir 88 defined by the baffle 60, while some of the oil goes to the bottom of the housing 48. The oil level in the bottom of the housing 48 is high enough that the teeth 41 of the wheel 40 will make contact with the oil, while the reservoir 88 provides a ready source of oil to be splashed upwardly toward the bearing assembly 38. The isolation of a portion of the oil provided by the baffle 60 minimizes or prevents the accumulation and depletion problem outlined above.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

What is claimed:

1. A wheel case for use on a vibratory device for vibrating aggregate material, the vibratory device having a frame and a rotating shaft extending transversely across the frame, the shaft being rotatably supported on bearings and having a wheel moveable through a circular path, the wheel case comprising:

a housing having a base wall, a cover wall, and an interconnecting sidewall extending a first distance between the base wall and the cover wall, the housing being sized to receive therein the wheel and the bearings and further being adapted to contain therein a quantity of lubricating oil for lubricating the wheel and the bearings; and a baffle mounted to the housing, the baffle extending inwardly into the housing a second distance less than the first distance and having a portion disposed adjacent the wheel path, the baffle being adapted to distribute lubricating oil from the baffle to the bearings in response to rotation of the wheel.

2. The wheel case of claim 1, wherein the baffle is mounted to the cover wall.

3. The wheel case of claim 1, wherein the baffle is mounted to the base wall.

4. The wheel case of claim 1, wherein the baffle includes an arc shaped portion.

5. The wheel case of claim 4, wherein the arc shaped portion is concentric with the wheel path.

6. The wheel case of claim 1, wherein the wheel includes opposing sides, and wherein an eccentric weight is mounted to one of the sides.

7. The wheel case of claim 6, wherein the eccentric weight is moveable through a circular path, and wherein the baffle is spaced radially outwardly from the weight path.

8. The wheel case of claim 7, wherein the baffle includes an arcuate portion.

9. The wheel case of claim 8, wherein the arcuate portion is generally concentric with the weight path.

10. The wheel case of claim 1, including a hub operatively connecting the shaft and the wheel, the hub being adapted to cooperate with the baffle for distributing oil to the bearings in response to rotation of the wheel.

11. The wheel case of claim 10, wherein the hub includes an outer portion having a plurality of circumferentially spaced holes.

12. The wheel case of claim 11, wherein the holes are aligned with the bearings.

13. The wheel case of claim 11, wherein the hub includes a circumferential outer edge and a peripheral sidewall spaced radially inward from the outer edge, an inwardly facing portion of the sidewall defining an oil receiving pocket aligned with, and being adapted to distribute oil, to the bearings.

14. A wheel case for use on a vibratory device for vibrating aggregate material, the vibratory device having a frame and a rotating shaft extending transversely across the frame, the shaft being rotatably supported on bearings and having a wheel moveable through a circular path, the wheel case comprising:

a housing defined in part by a pair of spaced apart walls and a surrounding interconnecting sidewall and being sized to receive therein the wheel and the bearings and further being adapted to contain therein a quantity of lubricating oil for lubricating the wheel and the bearings; and means for distributing oil to the bearings and the wheel in response to rotation of the shaft, the means being defined by cooperating portions of the wheel and the housing, the cooperating portion of the housing engaging only a single one of the spaced apart walls.

15. The wheel case of claim 14, wherein the housing includes a cover, and wherein the means includes a baffle mounted to the cover.

16. The wheel case of claim 14, wherein the housing includes a base, and wherein the means includes a baffle mounted to the base.

17. The wheel case of claim 14, wherein the means includes a baffle, and wherein the baffle is curved.

18. The wheel case of claim 17, wherein the baffle is curved to be concentric with the wheel path.

19. The wheel case of claim 14, wherein the means includes a baffle carried by the housing and being adapted to receive therein a portion of the oil and wherein the wheel includes opposing sides, and including an eccentric weight mounted to one of the wheel sides, the eccentric weight and the baffle being positioned to enable the weight to contact the oil portion and distribute the oil portion to the bearings.

20. The wheel case of claim 19, wherein the eccentric weight is moveable through a circular path, and wherein the baffle is spaced radially outwardly from the weight path.

21. The wheel case of claim 20, wherein the arcuate portion is generally concentric with the weight path.

22. The wheel case of claim 14, wherein the means includes a hub operatively connecting the shaft and the wheel, the hub including a plurality of circumferentially spaced holes, the holes being adapted to route oil to the bearings.

23. The wheel case of claim 22, wherein a portion of the hub defines a pocket, the pocket being adapted to receive therein a portion of the oil in response to rotation of the wheel top thereby distribute the portion to the bearings.

24. The wheel case of claim 22, wherein a portion of each hole is aligned with the bearings.

25. A vibratory device for vibrating aggregate material, the vibratory device having a frame and a rotating shaft extending transversely across the frame, the shaft being rotatably supported on bearings and having a wheel moveable through a circular path, the device comprising:

a housing being sized to receive therein the wheel and the bearings and further being adapted to contain therein a quantity of lubricating oil for lubricating the wheel and the bearings;

a baffle mounted the housing, the baffle extending inwardly into the housing and having a portion disposed adjacent the wheel path;

a hub operatively connected to the wheel and having a plurality of apertures therethrough, the apertures being adapted to provide a lubricant path to the bearings;

whereby in response to rotation of the wheel, the baffle and the hub cooperate to provide lubricant to the bearings.

26. A vibratory device having at least one rotating wheel rotatably supported on bearings, the device comprising:

a housing sized to surround the wheel and contain a quantity of lubricating oil, the housing being defined by a plurality of walls;

a baffle engaging at least one of the housing walls and having an extending portion disposed adjacent the wheel; and a hub operatively connected to the wheel, a portion of the hub being adapted to define a generally cylindrical oil receiving pocket in response to rotation of the wheel, the hub being sized so that the oil receiving pocket is disposed generally adjacent the bearings, the hub further having a plurality of apertures therethrough generally adjacent to the pocket so as to define a lubricant flow path to the bearings.

* * * * *